United States Patent [19]

Piltch

[11] 4,155,104

[45] May 15, 1979

[54] PROCESS TIMER

[76] Inventor: Abraham Piltch, 9618 Dilston Rd., Silver Spring, Md. 20903

[21] Appl. No.: 728,511

[22] Filed: Oct. 1, 1976

[51] Int. Cl.$^2$ .......................... G11B 5/00; G11B 15/18

[52] U.S. Cl. .......................................... 360/12; 360/71

[58] Field of Search ........................ 360/12, 71, 74, 79, 360/137; 35/13, 10, 8 A; 179/6 TA

[56] References Cited

U.S. PATENT DOCUMENTS

| | | | |
|---|---|---|---|
| 3,075,050 | 1/1963 | Lorenz | 360/74 |
| 3,222,597 | 12/1965 | Beatenbough et al. | 360/72 |
| 3,294,929 | 12/1966 | Fein | 360/72 |
| 3,579,870 | 5/1971 | Bennett et al. | 360/71 |
| 3,775,569 | 11/1973 | Lougery, Jr. et al. | 360/12 |
| 3,804,993 | 4/1974 | Honnold et al. | 360/12 |
| 3,858,195 | 12/1974 | Gregg, Jr. et al. | 360/12 |
| 3,876,840 | 4/1975 | Bryant, Jr. | 360/12 |
| 4,002,858 | 1/1977 | Giese | 360/79 |

OTHER PUBLICATIONS

"In the Darkroom", A. Francekevich, Populer Photography Magazine, 2/71.

"Ed Scully on Color", Modern Photography Magazine, 8/72.

*Primary Examiner*—Vincent P. Canney

*Attorney, Agent, or Firm*—Rose & Edell

[57] ABSTRACT

A process timer, particularly suitable for photographic processing, provides a pre-recorded continuous spoken indication of elapsed time, thereby permitting an operator to remain aware of the progress of the process without the requirement for visual monitoring of elapsed time. The spoken elapsed time indications are at selectable intervals and may be chosen so that longer intervals (e.g. minutes) are signalled during some portions of the timing cycle and shorter intervals (e.g. seconds) are signalled during other portions of the cycle. Automatic timed operation of external equipment is also possible as is the automatic resetting of the timer upon completion of a predetermined time interval.

3 Claims, 2 Drawing Figures

PROCESS TIMER

BACKGROUND OF THE INVENTION

The present invention relates to timers and, more particularly, to such timers which permit continuous awareness of elapsed time on the part of an operator who is occupied with other duties. The process timer described herein is particularly suitable for such applications as photographic development and printing. Prior art photographic processes provide either continuous visible indication of elapsed time or an audible indication upon completion of an operation, or both. Switching mechanisms may be incorporated in such timer for automatically initiating and completing a controlled process. Metronomic devices are also employed to facilitate manual modification in selected phases of an operation, such as dodging and burning in during enlarging.

A major problem inherent in such prior art timers involves the necessity for the operator to look at the elapsed time indicator in order to be aware of how far the process interval has progressed and how much more time remains. More specifically, photographic processes are normally conducted in darkened rooms in which the elapsed time indication is difficult to see. Further, the operator normally has many things to do during the photographic processes and diversion of his or her attention to view the elapsed time could adversely affect the process.

It is therefore a primary object of the present invention to provide a process timer which permits a process operator to be continuously aware of elapsed time without having to view an indication.

It is another object of the present invention to provide a timer which is particularly suitable for use during photographic processing.

It is another object of the present invention to provide a timer which is capable of providing continuous indication of elapsed time without requiring an operator to divert attention from a process.

SUMMARY OF THE INVENTION

The timer of the present invention provides an easily monitored continuous pre-recorded spoken elapsed time signal, permitting an operator to perform other functions and still be continuously aware of elapsed time without having to watch an indicator. The preferred embodiment of the present invention employs a pre-recorded magnetic tape of one or more tracks, on at least one of which is pre-recorded a periodic audio time signal with a voice readout after each signal. The tape is capable of being advanced at substantially constant speed and can be automatically returned to its initial starting position upon completion of the timing sequence. Selector switches are provided to select the track or tracks to be played back. There is also provided a means for presetting the length of time of tape advance, and the means for automatically resetting the tape to its initial position upon completion of a time interval. In addition a sound track may be activated a predetermined time before completion of the fall preset time period.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF THE PREFERRED EMBODIMENT

Figure 1:
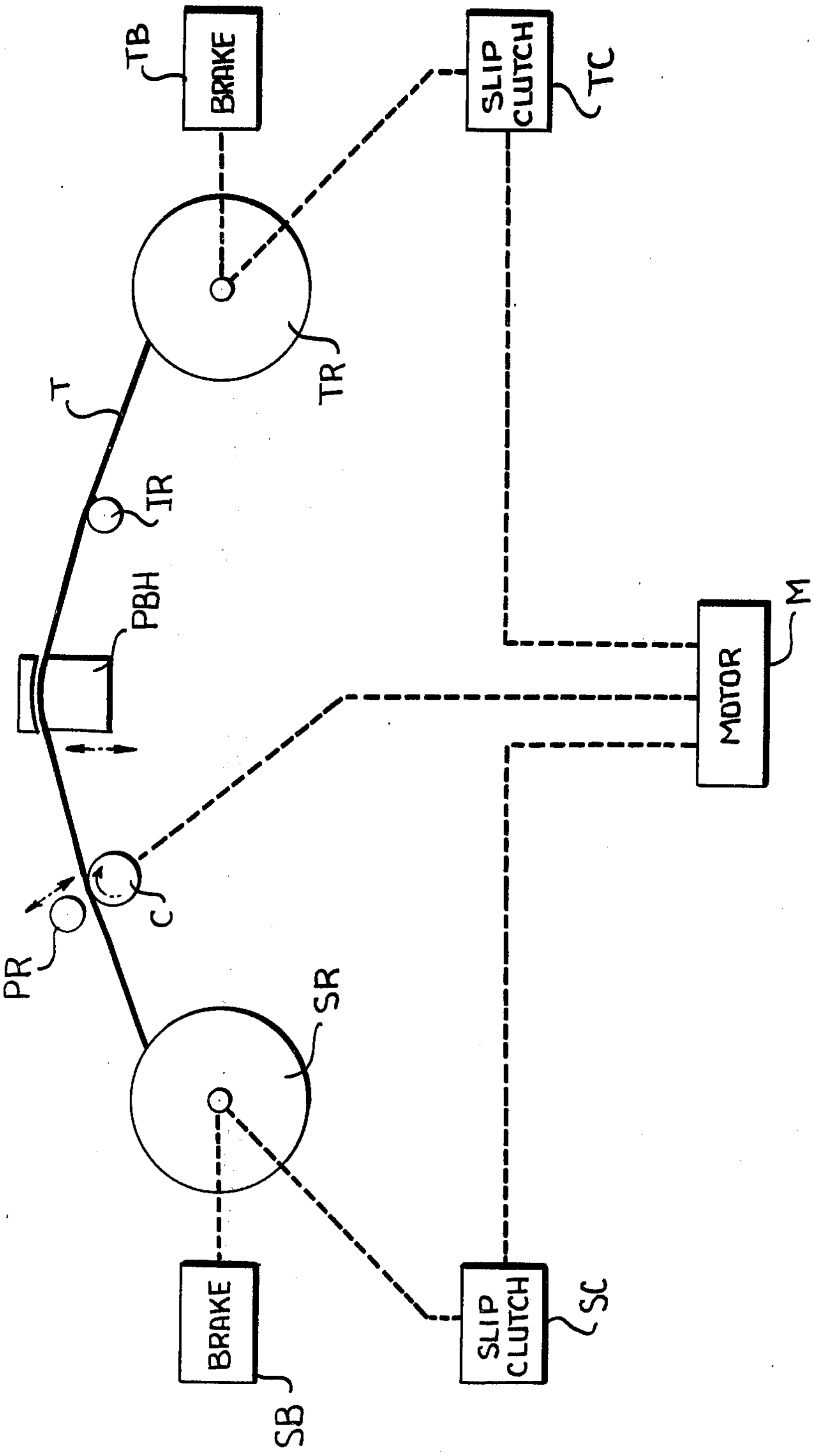
FIG. 1 is a simplified view of a tape transport with its control element illustrated in block diagrammatic form in accordance with the preferred embodiment of the present invention.

Referring specifically to FIG. 1 of the accompanying drawings, a pre-recorded multi-track tape T is transported between a supply reel SR and a takeup reel TR. The tape T traverses a path defined by a capstan C, a magnetic playback head PBH and an idler roller I. Solenoid-actuable slip clutches SC (for the supply reel) and TC (for the takeup reel) are driven by a motor M at times controlled by circuitry to be described in relation to FIG. 2. Likewise, solenoid-actuable brakes SB (for the supply reel) and TB (for the takeup reel) are controlled in accordance with the logic circuits illustrated in FIG. 2. The brakes SB and TB are pre-loaded so as to automatically release upon deenergization of their respective actuator solenoids. Capstan C is continuously driven in a forward tape direction by motor M and transports the tape at constant speed when pinch roller PR is moved into abutting relationship with the capstan. The pinch roller movement is solenoid-controlled in a manner described in relation to FIG. 2. The tape transport components are conventional and, of themselves, do not constitute part of the present invention. Rather, the invention relates to the manner in which a specifically pre-recorded tape, having voice elapsed time indicia recorded thereon, is controllable by the circuit of FIG. 2.

Figure 2:
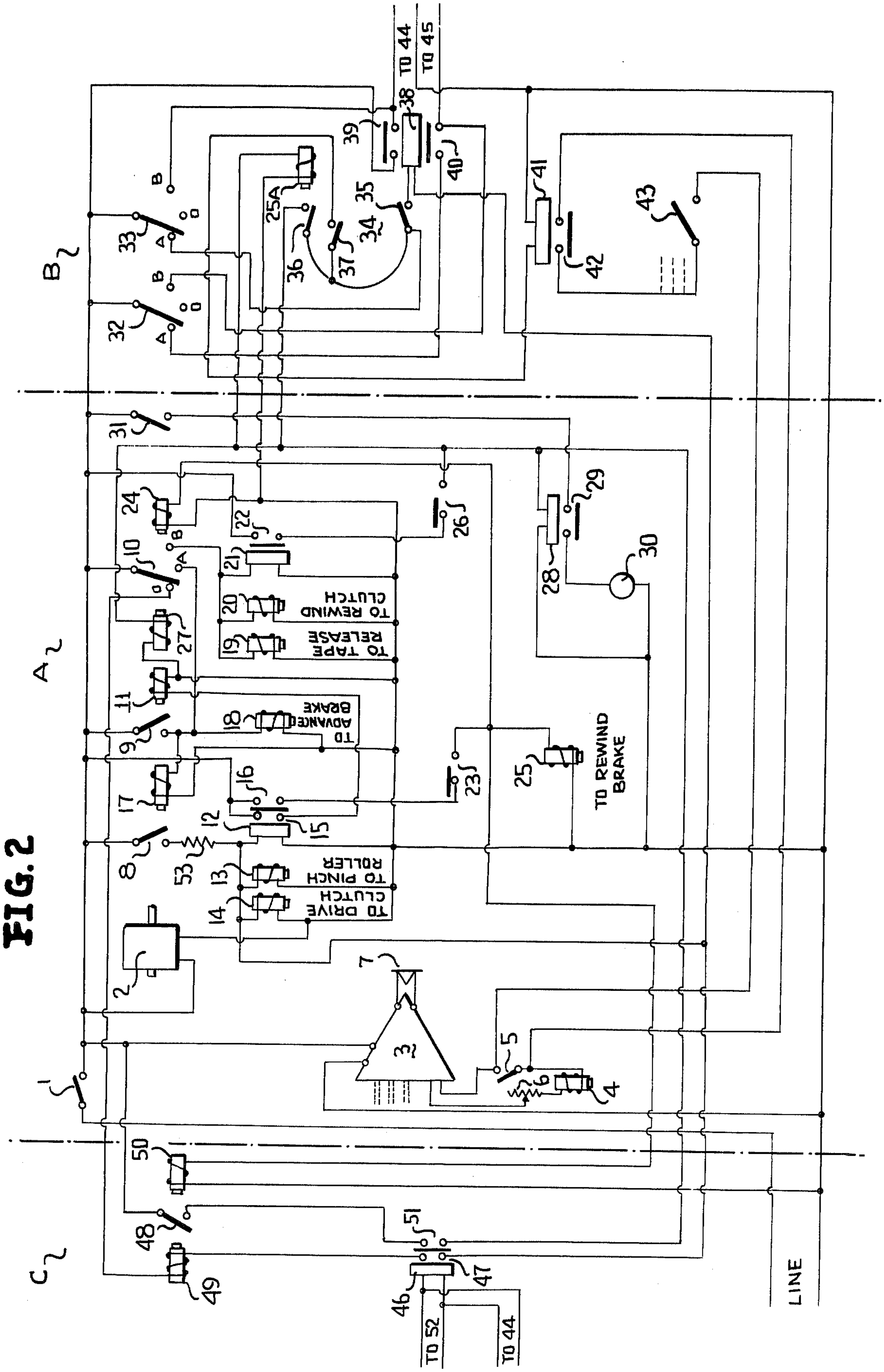
FIG. 2 is a schematic diagram of the electrical circuit for controlling tape advance in accordance with the present invention.

Before considering the circuitry of FIG. 2, it is important to an understanding of the present invention to first consider a typical example of utilization of the present invention. For purposes of illustration, consider the invention adapted to a photographic process in a darkroom, and that a four-track tape is employed. On the first track there is a time signal appearing every ten seconds with a voice readout occurring after each signal, the first signal sounding ten seconds after initiation of tape advance. On the second track the first time signal is sounded five seconds after initiation of tape advance and every ten seconds thereafter with a voice readout after each signal. When the first track is selected, the operator hears a signal every ten seconds; when both the first and second tracks are played back, the operator hears a signal every five seconds. These tracks are particularly useful for the intermediate and longer time operations associated with the development of film and paper in a darkroom. A timer intended only for these purposes need contain only two such tracks. On the third track there is a time signal recorded each second, without voice readout, the first signal sounding one second after initiation of tape advance. This is, in effect, a metronomic recording, most useful in such printing operations as dodging and burning in. This third track can be played back by itself or together with the first and second tracks. The fourth track, on which is recorded a continuous count, second by second, is normally played back alone and serves the same general purpose as the third track. A timer to be used only for printing need contain only the third and fourth tracks; a timer intended for developing and printing would utilize all four tracks. Thereneed be no limitation upon the unit of time counts recorded; it may be seconds, minutes, a combination thereof, or any arbitrary units.

Referring specifically to the timing and logic circuitry of FIG. 2, the timer of the present invention is illustrated in three distinct sections, A, B and C. Section A is the basic timer and may be utilized as a complete entity for timing operations with a voice readout. In such a configuration, the operator manually controls each timer function. If sections A and B are employed in combination, the overall timer provides control for external equipment together with voice readout. In this configuration the operator is able, at his option, to preset the desired time at which an external control cycle is automatically initiated. The use of combined sections A and C provides for the addition of voice readout to an external timer being utilized for external equipment control. In this configuration, the voice signal is automatically made time-coincident with the control time set on the external timer.

Referring more specifically to FIG. 2, it is noted that the logic and timing components are illustrated primarily as relays and switches as opposed to electronic components such as transistors and the like. This convention is utilized to facilitate the description and understanding of the present invention, it being understood that equivalent electronic components and integrated circuitry may be utilized to perform the functions described herein.

A switch 1 is utilized to apply primary power to the system from a pair of AC power lines, it being understood that DC power may also be utilized for particular embodiments of the invention. The motor M described in relation to FIG. 1 is connected across the power lines in a manner to be energized by the power switch 1. An amplifier 3 is also energized upon closure of switch 1 and it serves as an audio amplifier for each of the audio track signals utilized in the system. Controls for only one such track are schematically illustrated in FIG. 2, comprising a magnetic playback head 4, a track actuation switch 5, and a track gain control potentiometer 6. Controls for the remaining tracks are represented by dotted lines as providing an input to the audio amplifier 3. A loud speaker 7 is connected to receive the audio amplifier output signal and transduce it to an audible signal. Any or all of the individual audio tracks may be selected by the appropriate switch 5 in the circuit for each of the tracks.

The system is manually controlled by means of run switch 8, pause switch 9, and reset switch 10. Run switch 8 and pause switch 9 are single pole single throw switches. Reset switch 10 is a reset timer, for example of the type which is commercially available from the Eagle Signal Company, as Series HM or Series HO. When actuated, the actuator arm of reset switch 10 moves initially to contact A and, after a predetermined time interval (for example, 2 seconds) moves to contact B. Each of switches 8, 9 and 10 are manually actuable. In addition, run switch 8 is forced to its open position when solenoid 17 is energized; pause switch 9 is forced to its open position when solenoid 11 is energized; reset switch 10 is forced to its open or initial starting position when solenoid 27 is energized; and reset switch 10 initiates a timing sequence when solenoid 24 is energized.

When run switch 8 manually closed relay 12 is energized, causing normally open contacts 15 to provide an energization path for solenoid 11, thereby assuring that the pause switch 9 is open. In addition, actuation of relay 12 opens the normally closed contact 16 to deenergize the tape position sensor 23. Tape position sensor 23 is the sensor for the leading end of the tape and is conventional in nature. Closure of run switch 8 also energizes solenoid 13 which acts to move the preloaded pinch roller PR (reference FIG. 1) into contact with capstan C to drive the tape between them. In addition, closure of run switch 8 energizes solenoid 14 to engage the preloaded slip clutch drive PC for the takeup reel TR. Resistor 53, connected between run switch 8 and the solenoids 12, 13 and 14 is a voltage dropping resistor utilized to equalize the actuation voltage for each of these solenoids for different operational modes of the system. Specifically, as will be subsequently described, solenoids 12, 13 and 14 are actuable under the control of elements other than run switch 8; resistor 53 assures that the actuation voltage for the solenoids is the same no matter how the solenoids are actuated.

Tape advance may be manually terminated by means of either the pause switch 9 or reset switch 10. Closure of the pause switch 9 energizes solenoid 17 to assure that the run switch 8 is opened. This in turn assures that solenoids 13 and 14 are de-energized, thereby separating pinch roller PR from capstan C and disengaging slip clutch drive TC for the takeup reel TR. In addition, closure of pause switch 9 energizes solenoid 18 to activate the brake TB for takeup reel TR. This brake TB is preloaded so that it is automatically released whenever solenoid 18 is de-energized. Thus, actuation of pause switch 9 terminates tape movement but permits continued advance from the stopping point upon the next actuation of run switch 8.

As described briefly above, reset switch 10 is initially in position 0. When actuated the switch arm moves to position A for a predetermined length of time and then moves to position B where it remains until it is returned to position 0. In position A reset switch 10 terminates tape movement in the same manner as actuation of switch 9 terminates such movement; that is, by energizing solenoids 17 and 18.

Upon moving to position B, reset switch 10 energizes solenoid 19 to release the tape T from engagement with playback head PBH in preparation for rewinding. In addition, at position B the reset switch 10 energizes solenoid 20 to engage the slip clutch drive SC for the supply reel SR, thereby initiating a high speed tape rewind. Further, reset switch 10 in position B energizes relay 21 to open the normally closed contacts 22 in the tape position sensor circuit 26. Tape position sensor 26 is a conventional tape sensing circuit for the trailing end of the tape. It should be noted that the playback head position and slip clutch engagement are preloaded functions so that de-energization of solenoids 19 and 20 result in re-engagement of the tape T and disengagement of the slip clutch SC, respectively. Rewinding continues until the tape returns to its original starting postion, at which point a metallic strip bonded to the tape closes the contacts 23 in the leading end of tape sensor circuit. This results in energization of solenoid 24 to return the reset switch 10 to its starting position 0. In addition, closure of tape sensor 23 energizes solenoid 25 to actuate both brakes SB for the supply reel and TB for the takeup reel. Both of these breaks are automatically released when solenoid 25 is deenergized. Still another result of the closure of the tape sensor contact 23 is the energization of solenoid 25*a* in section B of the system.

Solenoid 25*a*, when energized, resets a clock 34 which is described in greater detail subsequently.

It should also be noted at this time that the trailing edge tape sensor circuit 26 automatically terminates tape advance before the end of the tape is reached. Specifically, a metal contact on the tape shorts contact 26 to effect energization of solenoid 27 which initiates a reset timing cycle at reset switch 10. In addition, closure of contact 26 also results in the energization of relay 28, thereby closing normally open contacts 29 and energizing the audible alerting signal generator 30, assuming of course, that switch 31 is closed. Switch 31 is a signal defeat switch which can be opened by the operator to prevent the audible signal generator from being automatically actuated upon reaching the end of the tape. Contact 29 is of the type which locks into its closed position upon energization of relay 28 and can only be opened by manual actuation by the operator.

The system as thus far described relates only to section A which as described above may be utilized as a complete entity in and of itself for timing an operation with voice readout. In this configuration, the operator manually controls each step of the timer's operation.

Referring to section B in FIG. 2, clock 34 is an automatic timing device, for example of the type designated Series HM and HO reset timers manufactured by the Eagle Signal Company. A clock triggering switch 35 is manually operable to initiate a clock timing sequence. The period of a timing sequence for clock 34 is manually adjustable. In one mode of operation of section B the clock 34 controls the timed operation of external equipments 44 and 45. Clock bypass switches 32 and 33 may be utilized to bypass the clock for controlling equipments 44 and 45 in the middle of a clock timing sequence or when the clock 34 is inactive. Switches 32 and 33 are single-pole three-position switches, each having an off or 0 position, an A position and a B position. Assuming both switches 32 and 33 to be in the A position, and assuming that clock 34 is set for some predetermined timing cycle, automatic operation ensues upon manual closure of switch 35. Such closure starts the clock 34, energizes external equipment control relay 38, and energizes relay 12 and solenoids 13 and 14 in section A. As described above, energization of relay 12 and solenoids 13 and 14 initiates tape advance so that the audible signals appearing on the tape may be sequentially heard by the operator. The energization of relay 38 closes normally open contacts 39 to activate external equipment 44 which, for example, may be a photographic enlarger. In addition, energization of relay 38 opens the normally closed contacts 40, deactivating external equipment 45 which, for example, may comprise a photographic safe light. Tape advance continues coincident with clock operation and external equipment control until the preset time on clock 34 has elapsed, at which time switch 35 automatically opens and switch 36 closes. Closure of switch 36 energizes solenoid 27 to initiate a reset timing cycle at switch 10 in section A, thereby recycling the tape to its original starting position in the manner described above. Energization of solenoid 25*a*, which as described above occurs when the rewinding of the tape is terminated by tape sensor 23, resets clock 34 to its previously preset time and automatically opens the clock cutoff switch 36.

Contact 37 in clock 34 automatically closes during the timing sequence of the clock at a time which is preselectible by the operator. In this manner the operator is permitted to introduce a particular audible signal from any of the tracks only for the period remaining in the timing cycle after closure of switch 37. More specifically, when switch 37 closes, relay 41 is energized to close normally open contacts 42. If any of the track selector switches 43 for the individual audio tracks on the tapes is closed, that switch shorts out the track switch 5 in its circuit to activate the sound in that track. Thus, for example, the operator may desire not to have a second-by-second readout rendered audible except for the last ten seconds of a timing cycle. Under such circumstances he would set switch 37 to close at a time ten seconds before the end of the timing cycle of clock 34 and would close the switch 43 associated with the second-by-second readout track while opening track switch 5 for that track. It should be noted that switch 37 is automatically reopened by solenoid 25*a* at the same time as solenoid 25*a* opens switch 36; that is, switches 37 and 36 are automatically opened at the termination of the timing cycle of clock 34.

As previously indicated the combination of sections A and B provides a timer which enables control of the external equipment in combination with the voice readout capability. In this configuration the operator is able, at his option, to preset the desired time on the clock 34 for the automatic operation of external equipment and to provide audible timing for all or any final portion of that operation.

Referring now to section C of FIG. 2 it is noted that this section is utilized as an interface with a timer from external equipment so that the voice readout capability of section A may be utilized in conjunction with that timer. Timer relay 46 is connected across the output circuit of a timer 52 from some external equipment and in parallel with the external equipment 44. In this manner, relay 46 is energized in time coincidence with the on period of external equipment 44. When relay 46 is energized normally open contacts 47 are closed so that relay 12 and solenoids 13 and 14 are energized to initiate the tape advance as previously described, whereby audible time indications are read out from tape T. In addition, energization of relay 46 results in the energization of solenoid 49, assuming that the reset switch 10 in section A is reset to its 0 position. Energization of solenoid 49 closes reset switch 48. Further, the energization of timing relay 46 opens normally closed contacts 51. When relay 46 is de-energized (when the external equipment 44 is off) contacts 51 are closed to energize the reset switch setting solenoid 27, thereby initiating the timing cycle for reset switch 10 to stop the advance and initiate the rewind of tape T so that the tape is returned to its original starting position in the manner previously described. During the rewind cycle of tape T the leading end of tape sensor 26, upon closure, energizes solenoid 50 to reopen reset switch 48. If the operator has set the external timer 52 for a longer period of time than that available on the prerecorded tape T, the trailing end of tape sensor 23 terminates tape advance when that point is reached and resets tape T to its original position in the manner previously described. However, when sections A and C are used in conjunction with one another, the de-energization of relay 12 and solenoids 13 and 14 occurs as a result of the opening of the circuit through solenoid 49 and contacts 47 as reset switch 10 steps from position 0 to position A. After the completion of the rewind cycle for tape T, the timer restarts when reset switch 10 returns to its rest position at 0, assuming external timer 52 has not reached the end of its timing cycle and relay 46 remains energized. Under such conditions, signal generator 30, if not intentionally disabled by the operator by means of switch 31, indicates that the timer is on a second or subsequent cycle of operation. Sections A and C may be utilized with or without Section B, depending upon whether or not the system is to control external equipment.

In a typical photographic darkroom utilization of the timer system the tape T would have 4 tracks recorded thereon as previously described. In using the timer the operator selects the tracks to be heard by closing the switches 5 for those tracks. In addition, the operator adjusts the audio level of the different tracks to his liking by control of potentiometer 6. Closure of the run switch 8 initiates tape advance in the manner described, permitting the audible timing signals to be heard by the operator. Tape advance is stopped either by operation of pause switch 9 or reset switch 10. Closing the pause switch opens the run switch, terminates transport of the tape T immediately, but does not effect a rewind so that timing may continue from that point upon the next closure of run switch 8. Closure of reset switch 10 not only terminates advance of tape T but also rewinds the tape to bring it back to its original starting position. By controlling external equipment such as an enlarger with clock 34, the duration of repeated enlarger exposures may be automatically controlled and rapid and consistent duplication from a given negative achieved. The audible timing signal further assists the experienced operator in utilizing dodging, burning in, vignetting and similar techniques to achieve the desired effects in the finished prints.

While described primarily for use with a darkroom facility, the automatic audible timer of the present invention is to be understood as having broader utilization in any operator-controlled processes where timing is important but clock watching is inconvenient.

While I have described and illustrated one specific embodiment of my invention, it will be clear that variations of the details of construction which are specifically illustrated and described may be resorted to without departing from the true spirit and scope of the invention as defined in the appended claims.

I claim:

1. A process timer comprising:

sound record means having at least a first sound track on which is recorded a series of spaced voice announcements of elapsed time from an arbitrarily selectable reference time;

drive means for selectively moving said sound record means in first and second alternative directions, movement in said first direction being at a speed which is a predetermined function of time;

playback means for rendering said recorded voice announcements audible when said sound record means is moved in said first direction;

wherein said recorded voice announcements are spaced along said first sound track such that said voice announcements of elapsed time are rendered audible at corresponding uniformly spaced times when said sound record means is moved in said first direction;

manually actuable means for initiating movement of said sound record means in said first direction by said drive means;

automatically and manually actuable reset means for initiating movement of said sound record means by said drive means in said second direction;

means for automatically terminating movement of said sound record means in said second direction when a predetermined point in said record means reaches said playback means;

adjustably pre-settable and manually actuable clock means for defining a time period;

manual actuator means for simultaneously actuating said clock means to begin said time period and actuating said drive means to move said record means in said first direction;

means responsive to actuation of said clock means for energizing external equipment; and means responsive to termination of said time period for simultaneously de-energizing said external equipment and automatically actuating said reset means.

2. The process timer according to claim 1 further comprising:

a second sound track on said sound record means having recorded thereon a sequence of elapsed time voice announcements which are more closely spaced than the voice announcement on said first track;

control means, automatically actuable at a presettable time after initiation of said time period at said clock means, for rendering the voice announcements on said second track audible.

3. A process timer comprising:

sound record means having at least a first sound track on which is recorded a series of spaced voice announcements of elapsed time from an arbitrarily selectable reference time;

drive means for selectively moving said sound record means in first and second alternative directions, movement in said first direction being at a speed which is a predetermined function of time;

playback means for rendering said recorded voice announcements audible when said sound record means is moved in said first direction;

wherein said recorded voice announcements are spaced along said first sound track such that said voice announcements of elapsed time are rendered audible at corresponding uniformly spaced times when said sound record means is moved in said first direction;

manually actuable means for initiating movement of said sound record means in said first direction by said drive means;

automatically and manually actuable reset means for initiating movement of said sound record means by said drive means in said second direction;

means for automatically terminating movement of said sound record means in said second direction when a predetermined point in said record means reaches said playback means; and means responsive to energization of external equipment employed in said process for automatically initiating movement of said record means in said first direction.

* * * * *